INVENTORS:
JAMES F. ELLIOTT
SAMUEL M. KORZEKWA,
RAYMOND J. MCARTHUR,

BY *Richard V. Lang*

THEIR ATTORNEY.

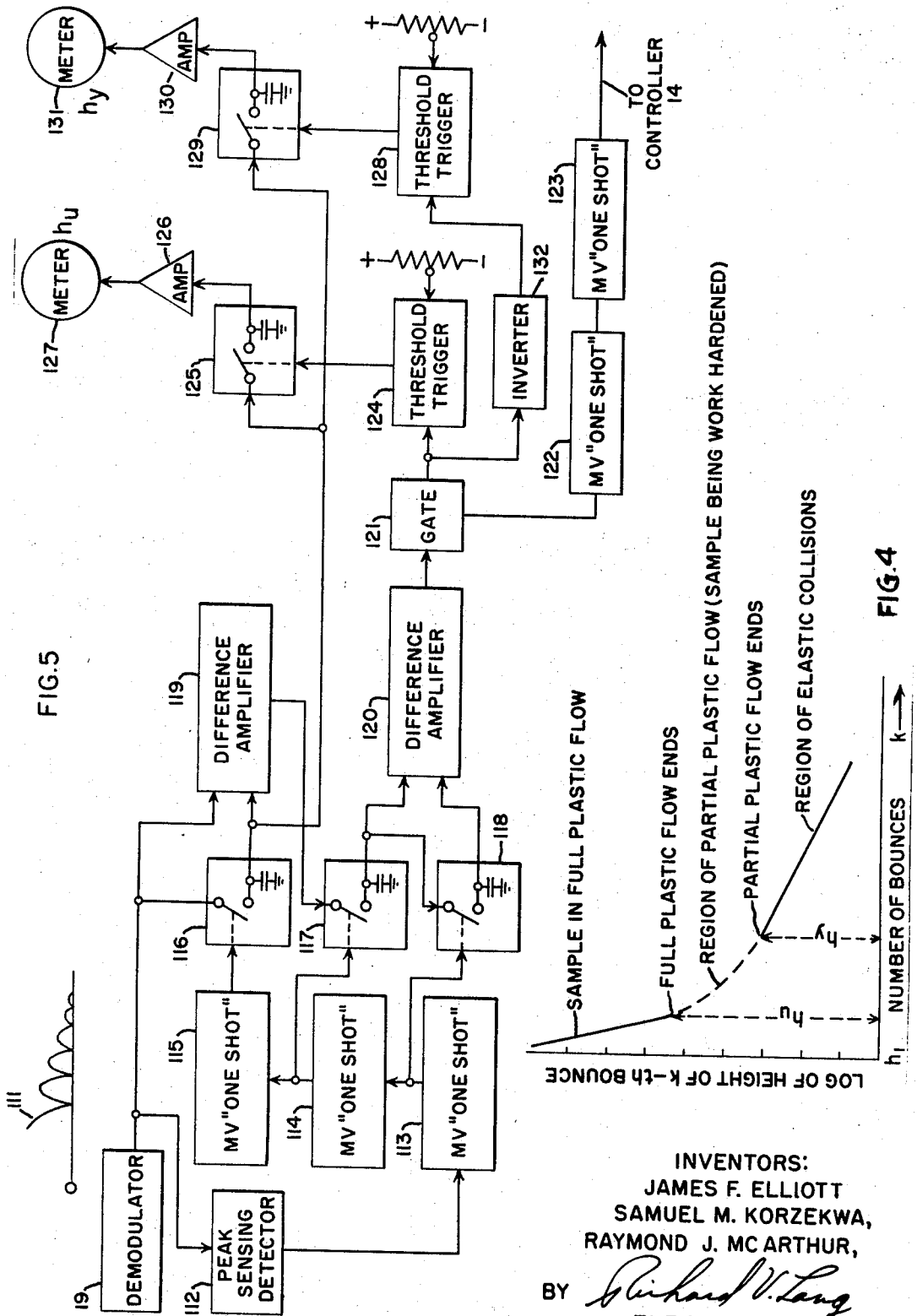

United States Patent Office 3,425,263
Patented Feb. 4, 1969

3,425,263
APPARATUS FOR MEASURING SOME MECHANICAL PROPERTIES OF A MATERIAL
James Franklin Elliott, Syracuse, Samuel M. Korzekwa, Baldwinsville, and Raymond J. McArthur, Liverpool, N.Y., assignors to General Electric Company, a corporation of New York
Filed Mar. 6, 1967, Ser. No. 620,781
U.S. Cl. 73—12
Int. Cl. G01n 3/02
11 Claims

ABSTRACT OF THE DISCLOSURE

Apparatus capable of sensing the hardness and quantities relating to the ultimate tensile strength, the yield point, and the strainless hardness and displaying this information are herein disclosed. The apparatus comprises a probe operating upon the Schleroscopic principle. The probe has an indenter adapted to impact upon the material under test and to rebound successively in decaying to a rest position. In pursuing this motion, a wide range of tip pressures are produced—some adequate to achieve fully plastic flow, some partial plastic flow, and some producing only elastic collisions. The ratios between successive peaks and changes in these ratios signify changes in deformative effect upon the sample by pressure which is known by the height of the associated peaks. An oscilloscopic display is disclosed responsive to these variables and indicating the underlying material properties. Apparatus providing metered indication of certain of these properties is also disclosed.

BACKGROUND OF THE INVENTION

Field of the invention

The invention relates to test apparatus for making hardness measurements and evaluating ultimate tensile strength, the yield point, and the strainless hardness.

Description of the prior art

The Shore Schleroscope in which an indenter is allowed to fall and the rebound height measured is related in principle to the present invention. The tip pressures generated in the Shore instrument are ordinarily adjusted to exceed that required for full plastic flow, and only hardness is measured. It does not appear that the equipment was adapted to operate with successive rebounds, nor does it appear to have been used to detect ultimate tensile strength or the yield point which require lesser tip pressures. When measurements of the ultimate tensile strength or yield point were required in the past, the common technique involved stressing a sample until it broke or was deformed. In general, prior art testing of these properties was destructive of the sample.

SUMMARY OF THE INVENTION

It is an object of the invention to provide a novel apparatus capable of measuring ultimate hardness, and quantities related to the ultimate tensile strength, the yield point, and the strainless hardness.

It is an additional object of the invention to provide a visual display which gives readily interpreted information of the hardness, ultimate tensile strength, yield point and strainless hardness.

It is a further object of the invention to provide a novel apparatus for measuring the ultimate tensile strength of a material non-destructively.

It is still another obpect of the invention to provide a novel apparatus for measuring the yield point of a material non-destructively.

These and other objects, in one form of the invention may be achieved by means of a probe having an indenter adapted to be dropped upon a surface to be tested and to rebound successively, and which produces an electrical output, indicative of the height of the peak. Means are provided for converting the output into logarithmic form and projecting it on a visual display plotted against the number of the bounce. In this way a departure from linearity in bounce peak ratios is readily apparent and the corresponding bounce peak height is used to determine the point pressure required to achieve this non-linearity. Changes in linearity occur at the points where the sample departs from full plastic flow correspoding to the ultimate strength and where the sample ceases to yield corresponding to the yield point.

In another form of the invention, differences are taken between the logarithms of the successive peaks, and differences of these differences are taken for sensing non-linearity in the ratios. The corresponding point pressure, where such detected nonlinearity occurs, is then applied to a meter to indicate the ultimate tensile strength or the yield point.

DESCRIPTION OF THE PREFERRED EMBODIMENTS

Figure 1:
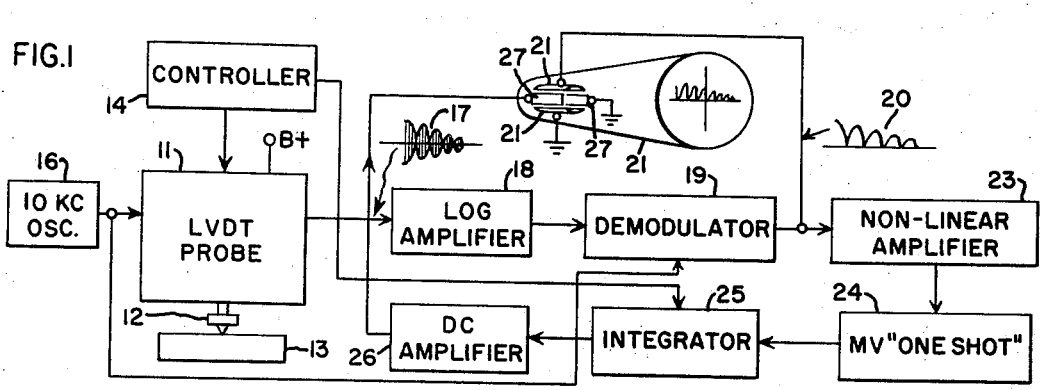
Figure 3:
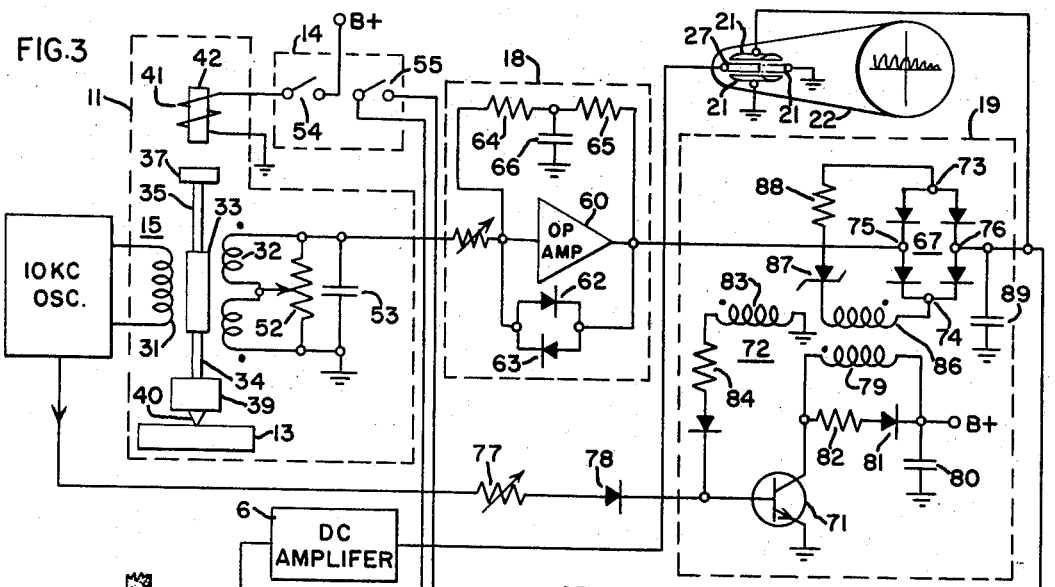
Figure 2:
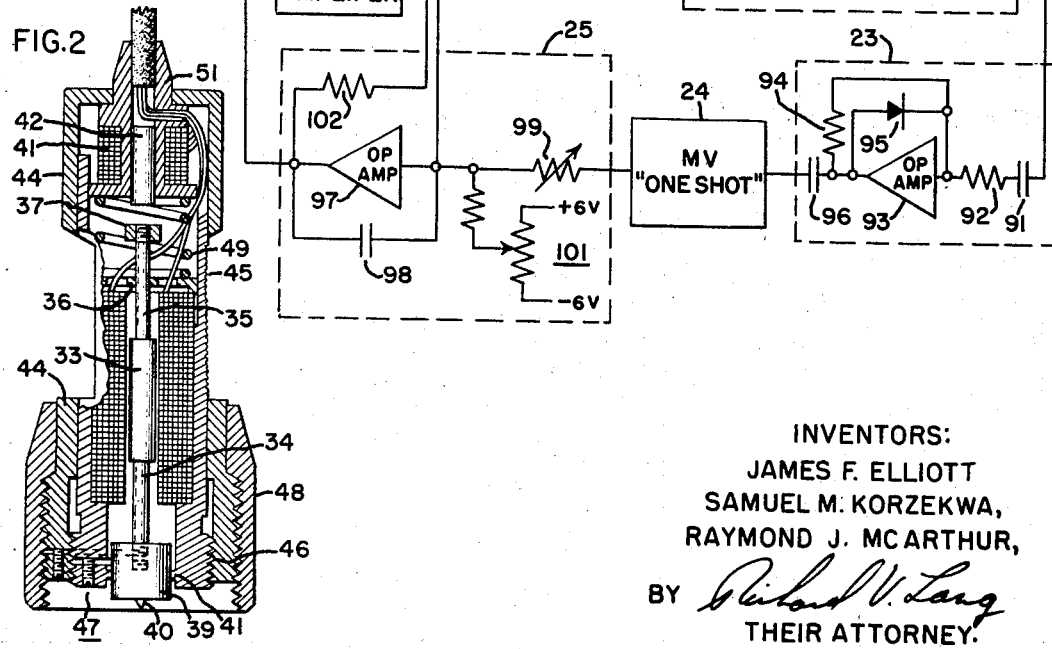

The first embodiment of the invention for measuring hardness, ultimate tensile strength and the yield point is shown in FIGURES 1, 2, and 3. FIGURE 1 depicts the embodiment in block diagram form; FIGURE 2 the mechanical details of the probe; and FIGURE 3 a more detailed circuit description. FIGURE 4 is plot of the logarithm of the heights of successive bounces as a function of bounce number. FIGURE 5 is a block diagram of an apparatus providing a metered indication of material properties.

Referring particularly to FIGURE 1, the inventive embodiment is seen to comprise an LVDT probe 11 including an indenter 12 adapted to be dropped to impact upon a material 13 being tested, under the control of the controller 14. The position of the indenter 12 during fall and rebound is continuously monitored by the linear variable differential transformer 15 (FIGURE 2), a component of said probe assembly 11, which is supplied with 10 kc. excitation energy from oscillator 16. The positional indication takes the form of an amplitude modulation of the 10 kc. wave illustrated at 17, which is fed to the logarithmic amplifier 18 for logarithmic amplification. The logarithmic output is synchronously demodulated in demodulator 19 at the 10 kc. carrier rate and the detected envelope shown at 20 is applied to the vertical deflection electrodes 21 of the storage oscilloscope 22.

The remaining components 23, 24, 25 and 26 in the block diagram of FIGURE 1, provide means for obtaining the horizontal deflection voltages. The block 23 is a nonlinear amplifier performing a low noise differentiating function upon the detected envelope. At the nulls in the detected wave form 20, it generates output pulses to fire the "one shot" multivibrator 24. The multivibrator 24 is designed to produce a constant energy output pulse which is integrated in integrator 25, amplified in the d.c. amplifier 26 and then applied to the horizontal deflection plates 27 of the storage oscilloscope 22 to space each rebound peak at equal distances. The storage tube graphically portrays each of the material properties sought.

Considering now the foregoing embodiment in greater detail, the electrical circuit of probe 11 is best illustrated in FIGURE 2, while the mechanical details are best illustrated in FIGURE 3. The linear variable differential transformer consists of a primary or excitation winding 31, a carefully balanced pair of secondary windings 32, both windings being arranged about the axially movable elongated cylindrically shaped position sensing core member 33. The core member 33 is of a high permeability magnetic alloy. Its axial position differentially influences the coupling between the primary winding 31 and the individual windings 32. The position sensing core is provided with axially extending non-magnetic supporting shafts 34 and 35 which pass outwardly of the field region of the windings 31 and 32. The core 33 and its shafts 34 and 35 form integral components of the indenter. The linear variable differential transformer 15 is capable of sensing small displacements as small as 0.0001 inch. In operation, it produces an alternating output voltage which increases linearly from a null value as the core is displaced up or down from a reference or "null" position. Its range of linearity on one side of null is typically 0.250 inch.

Continuing now a detailed description of the indenter 12 of the probe 11, the upper shaft 35 passes through an upper bearing 36 typically of Teflon and loosely fitting. The upper extremity of the shaft 35 bears a soft iron pick-up core member 37. The lower shaft 34 bears a relatively massive member 39 having a conical point 40 on its under surface which forms the indenting tip of the indenter. The member 39 is of generally cylindrical construction and is arranged to pass through a lower bearing assembly 41, loosely fitted and typically of Teflon. The mass of member 39 is selected to augment the preexistent mass in the members 33, 34, 35 and 37 to the desired value suitable for making the hardness measurement. The conical point 40 has a point of predetermined radius and is of a material which is relatively hard with respect to any material under test. It is securely fastened to the member 39.

The last major component contained within the probe is a solenoid arranged in the upper portion of the probe 11. It includes a coil 41 and a soft iron core 42. When suitably energized the solenoid is adapted to suspend the indenter by the field it induces in the indenter supporting core member 37. The under surface of the solenoid core 42, thus forms the upper stop for the indenter.

The probe 11 is housed in a generally cylindrical case 44 having two large lateral openings. The case permits two adjustments to be made—the drop height of the indenter and a zero adjustment of the electrical output when the tip 40 of the indenter is resting on the surface of the material being tested. The solenoid is secured to the upper portion of the shell 44 and is thus fixed with respect to it. The differential transformer windings are supported within an inner sleeve member 45 which is threaded into the case 44. The sleeve 45 has a knurled outer surface which is exposed through the lateral openings of the case 44 to permit adjustment. The threads between the case 44 and the sleeve 45 are shown at 46 and are provided with locking means at 47 for preventing unintentional rotation of the inner sleeve member 45. The locking means 47 comprises a radial slot placed close to the lower extremity of the sleeve member 45, and a set screw threaded into the lower extremity. Rotation of the set screw axially distends the portion of the sleeve member below the slot and locks the threads 46. Rotation of the sleeve member 45 elevates (or lowers) the windings of the differential transformer within the case 44 and reduces (or increases) the distance between the stop 42 and the indenter null position in the differential transformer. This adjustment is used to set the drop height. Ordinarily it is on the order of 0.050 inch.

The zero adjustment is provided by means of an annular ring 48 threaded upon the casing 44. When the probe 11 is set down upon the sample to be studied, the under surface of the member 48 supports the probe assembly. The point 40 of the indenter, which may extend below the under surface of the ring 48, is then forced upwardly until it is coplanar with it, as it engages and is likewise supported upon the surface of the sample 13. Rotation of the annular ring 48 thus elevates or lowers the probe assembly relative to the indenter which is supported by its tip 40 upon the sample surface. The annular ring 48 is ordinarily adjusted to produce a null in the electrical output of the probe with the indenter in surface contact.

When the LVDT output is nulled with the indenter lying upon the surface of the sample, the LVDT output, which should linearly vary with the height of the indenter, then directly measures the height of the indenter relative to that surface. Since the drop height, typically 0.050 inch, is substantially less than the 0.250 inch which the LVDT is capable of measuring linearly, the LVDT is linear throughout and may be used to measure all distances that are of interest, including the initial drop height. Successive rebounds may be measured by this same device down to those on the order of 0.0001 inch.

The coiled compression spring 49 maintains the solenoids 41, 42 and the windings of the LVDT 15 in mutually fixed relationships once they have been adjusted. A bushing 51 is provided in the upper extremity of the probe for coupling away the electrical connections from the windings 31 and 32 of the LVDT and the solenoid 41, 42.

The exciter winding 31 of the LVDT in the probe 11 is coupled to the source 16 of alternating current energy. Typically the source is an oscillator operating at 10 kc. with a stable amplitude of about 10 volts. The secondary winding 32 is formed of two matched secondaries connected together in mutual opposition. Their common terminal is coupled to an adjustable tap of variable resistance 52. This resistance is coupled across the secondary winding, and is shunted by a capacitor 53. Adjustment of the tap on resistance 52 effects a final zero adjustment in the LVDT output in the presence of slight inaccuracies in its manufacture and other circuit strays. The output circuit of the LVDT probe is unbalanced to ground with the output being derived from one outer terminal of the secondary winding 32 and the other outer terminal grounded.

The output from LVDT probe 11 is illustrated at 17 (FIGURE 1). Assuming that the probe has been released and is falling and rebounding in decaying to a rest position, the output is a modulated carrier. The carrier is at 10 kc., the frequency of the oscillator 16, and its envelope amplitude depicts the instantaneous height of the indenter as it proceeds through these motions. Since the periods between bounces is typically less than 1/100 of a second, the carrier which is 100 times higher in frequency is quite adequate to convey accurate positional information.

The initiation of the fall of the indenter is produced by the controller 14. The controller may take the form of a double control having a first SPST switch with contacts 54 and a second SPST switch with contacts 55. The winding 41 of the solenoid is coupled in series with the contacts 54 and a B+source and ground. Opening these contacts interrupts the flow of current through the solenoids 41, 42 and releases the holding action exerted on the pickup core 37 of the indenter. The indenter falls. The second switch performs a function to be subsequently described.

The logarithmic amplifier 18 to which the probe assembly signal 17 is fed, consists of an operational amplifier 60, a variable resistance 61, serially connected between the output of the LVDT probe assembly 11 and the input to the operational amplifier 60, a pair of shunted mutually reversely connected diodes 62 and 63 coupled between the input and output terminals of the operational amplifier, and a second network consisting of serially connected resistances 64 and 65, with their mutual connection point by-passed to ground by capacitor 66. The second network is also coupled between the input and output terminals of the operational amplifier 60.

The operational amplifier is of the phase inverting variety, having a bandwidth of 1 megacycle, a high degree of linearity in amplification, and a gain of 100 db. The diodes are low leakage silicon diodes and are selected to provided a logarithmic V–I curve that is linear over four or five decades of current. To avoid drift of the operational amplifier, particularly at zero signals when the silicon diodes have a high impedance, the second network consisting of resistances 64, 65 and capacitor 66 is provided. This latter network, by virtue of a low pass characteristic set well below 10 kc., has no effect on the logarithmic generation of the input signal which is carried on a 10 kc. carrier. The crossover between expansion of small signals and compression of large signals is adjusted by the variable resistance 61 which provides a gain control. After "logging" in the logarithmic amplifier 18, the signal is coupled to the demodulator 19.

The demodulator 19 comprises a four diode bridge 76, a blocking oscillator including a transistor 71, a three winding pulse transformer 72, and sundry minor components for injection of the 10 kc. carrier, feedback, filtering, and biasing.

The diode bridge 67 may be seen to consist of the four diodes arranged in the traditional diamond and all poled for easy current flow between terminals 73 and 74. The output of the logarithmic amplifier is coupled to intermediate terminal 75 and the demodulated output of the synchronous demodulator 15 appears at the intermediate terminal 76, which is opposite to terminal 75.

The blocking oscillator comprises the transistor 71 having its emitter grounded, and its base coupled to the 10 kc. oscillator 16 through serially connected phase adjusting variable resistance 77 and positive pulse passing diode 78. The pulse transformer primary 79 is connected between the collector of transistor 71 and a source of positive bias potentials. A large grounded filter capacitor 80 is also provided at the B+ connected terminal of the primary winding. A reversely poled diode 81 in series with a resistance 82 shunts the primary winding 79 for damping. The feedback winding 83 of the pulse transformer 72, has one terminal grounded, and the other terminal coupled through series connected resistance 84, positive pulse passing diode 85 to the base of transistor 71. The feedback winding 83 is poled to provide the regenerative feedback necessary to blocking oscillator operation. The output winding 86 of the pulse transformer has one terminal coupled through a Zener diode 87 and current limiting resistance 88 to diode bridge terminal 73. The other terminal of the output winding 86 is coupled to diode bridge terminal 74. The Zener diode tends to reduce leakage through the bridge in the absence of a pulse output.

The blocking oscillator produces a pulse, typically of 10 to 15 microseconds duration, adjusted by the phasing control 77 to occur at peaks in the 10 kc. carrier. A filter capacitor 89 for storing the detected envelope is coupled to diode bridge terminal 76. The diode bridge, under the influence of the momentary pulse which makes all diodes in it conductive, then appears to equalize the voltage between alternate terminals 75 and 76 during these instants, and to charge or discharge the capacitor 89 in accordance with the logarithmically amplified input wave form. This demodulated wave form 20 is applied to the vertical deflection circuit 21 of storage cathode ray tube 16. The demodulated wave form is also coupled to the nonlinear amplifier 19 for further processing to achieve a horizontal deflection of the output display.

The nonlinear amplifier 23 comprises an input capacitor 91 for differentiating the input signal, a resistance 92 for reducing high frequency gain and an operational amplifier 93 all connected in series. The operational amplifier may be similar to element 60. A high valued drift inhibiting resistance 94 is connected between the input and output terminals of the amplifier 93, and similarly connected feedback diode 95 suppresses positive going output pulses. Thus, the nonlinear amplifier 23 produces a noise free series of negative going output pulses timed at the moment when the demodulated wave form is near null in the envelope 17.

The output pulse is then coupled through capacitor 96 to "one shot" multivibrator 24, which generates a standardized output pulse. That output pulse is applied to the integrator 25.

The integrator 25 consists of an operational amplifier 97, an integrating capacitor 98 coupled between its input and output terminals, an input resistance 99, variable for adjusting the weight of applied pulses, a drift nulling circuit 101 coupled to the input terminal of the operational amplifier, and finally an integrator discharge circuit including contacts 55 in the controller 14 and discharge resistor 102. The operational amplifier 97 may be similar to elements 60 and 93. The drift nulling circuit consists of a first resistance, coupled between the amplifier input and an adjustable tap on a second resistance. The tapped resistance is coupled between positive and negative bias potentials. The controller 14, as previously described, contains a second SPST switch having contacts 55 connected in series with the capacitor discharging resistance 102 between the input and output of the operational amplifier 97. Accordingly, when the probe is to be operated, they are closed and opened momentarily to discharge the integrator 25 a moment before the indenter is released. Once started, at each subsequent contact with the sample surface by the indenter, a pulse is passed to the integrator and stored in capacitor 98, each time stepping its stored output voltage to a high value. The integrator output is amplified in D.C. amplifier 20 and applied to the horizontal deflection circuit of the storage cathode ray tube 16. Thus the trace is shifted for each successive bounce an equal horizontal increment across the face of the cathode ray tube, displaying the height as a function of the bounce number.

The logarithmic display of successive bounce heights as a function of bounce number contains information for determining three material properties. The initial straight sloped region has a slope which equals the log of the Shore hardness number. The height ($h_u$) at the onset of curvature gives the last point of complete plastic flow giving a dynamic pressure closely related to the ultimate tensile strength of the sample. The height ($h_y$) at the end of the curvature terminates the region of partial plastic flow and gives the yield point (or elastic limit) of the material. Beyond this point no permanent deformation takes place and the continued collisions are elastic. (The slope at the yield point may be defined as the strainless hardness and may also be observed from the display.) These properties are illustrated graphically in FIGURE 4.

The copending application S.N. 620,801 of J. F. Elliott, et al. describes a technique for deriving the simple Shore hardness number, involving determining the ratio of the initial height of the indenter to that attained on the first bounce (during full plastic flow). This quantity may be readily obtained in numerical form by the techniques taught in that application from the output of the probe 11 as by measuring the amplitude of the first rebound.

The ultimate strength ($h_u$) and the yield point ($h_y$) may be directly read out by the apparatus illustrated in FIGURE 5. An examination of the decay sequence illustrated in FIGURE 4 shows that when one plots the logarithm of the heights of successive bounces against the number of the bounce, that there are three regions, and that they have distinctive geometric properties. The decay sequence commences with a straight line, having appreciable slope and terminates with a straight line having a reduced slope. The two linear segments are connected with an intermediate curved region and all tend downward. In the decay sequence, the curvature initially commences at the point ($h_u$) corresponding to a change from full plastic flow. The curvature terminates at the point ($h_y$) corresponding to the point where the material ceases to yield and the bouncing becomes elastic. The ultimate strength and yield point are thus identified with these changes in curvature, and the changes in curvature may be sensed by a process approximating the taking of a second derivative. By sensing an increase above a threshold value in the difference between two successive differences—which is the precise process practiced here—the onset of curvature is detected. Similarly when the difference between two successive differences falls below a threshold value, return to linearity is sensed.

The foregoing operation is explained in greater detail in FIGURE 5. The block diagram in FIGURE 5 commences at the output of the synchronous demodulator 19. Prior to this point circuit components similar to those used in the first embodiment may be employed. The output of the synchronous demodulator 19 produces a detected wave form generally as illustrated at 111. It is seen to consist of a succession of humps gradually decaying to zero with the 10 kc. carrier removed.

The apparatus in FIGURE 5 may be seen to comprise a peak sensing detector 112 coupled to the output of demodulator 19, a sequence of three serially connected "one shot" multivibrators 113, 114 and 115, all connected to the output of 112, three sample and hold networks 116, 117 and 118, each having their timing control coupled to the output of one of said multivibrators, and two difference amplifiers 119 and 120 generally interconnected with the sample and hold networks. The foregoing components function to obtain successive differences of differences in the rebound heights—quantities which approximate the second derivative. Subsequent components 121, 122 and 123 determine the time of selection of this information, and the remaining components participate in evaluating it and numerically indicating the quantities $h_u$ and $h_y$.

The peak detector 112 senses the moment of occurrence of each of the successive peaks in the 111 wave form. While it may take a number of forms, it may consist of an R-C differentiator and a diode gate aided by an operational amplifier. R-C differentiator produces an output signal which can be thresholded at zero level, the moment at which the peak of the non-differentiated signal occurs. The output signal, either directly or after further amplification, is then used to fire the "one shot" multivibrator 113, coupled to the output of the peak detector.

The multivibrators 113, 114 and 115 are each coupled in cascade to fire one another in sequence and are of the conventional "one shot" variety. They are selected to have a time duration which is on the order of a few microseconds. The period should be sufficiently short that all three pulses, which are successively produced, occur at times on the same peak during which the change in amplitude is negligible relative to the difference quantities that are subsequently taken. They should be long enough to permit the sample and hold networks to function.

The pulse produced in each multivibrator 113, 114 and 115 is applied to a timing control input of a corresponding sample and hold network 118, 117 and 116, respectively. The sample and hold network 116 has its signal input connected to the output of the demodulator 19. Its "hold" output is connected to an input terminal of the difference amplifier 119. The other input to the difference amplifier 119 is coupled to the output of the demodulator 19. It may be observed that after the peak of the first rebound in wave form 111, the output of the difference amplifier contains a "difference" between the stored peak value from 116 and the instantaneous value supplied from 115. When the second peak occurs, and more precisely when 114 fires, the output of the difference amplifier 119 is sampled by 117, and held at its hold terminal. A moment later when 115 fires, a new stored peak value is fed to the difference amplifier 119 and computation of a second difference is initiated.

The second difference amplifier 120 has one input coupled to the hold output of network 117 and one terminal coupled to the hold output of network 118. The hold output of network 117 is coupled to the signal input of sample and hold network 118. Accordingly, when the third peak in wave form 111 is achieved, the first peak stored at the hold terminal of 117 is passed, when multivibrator 113 fires, to the hold terminal of 118 and becomes one input of difference amplifier 120. A moment later when 114 fires, network 117 samples and holds the second difference from 119 and passes it to the other input of difference amplifier 120. Having two difference inputs, the difference amplifier 120 now computes the first difference of two differences.

In a repetitive sequence on each peak of wave form 111 thereafter, the multivibrator 113 fires, causing sample and hold network 118 to transfer a third difference quantity to hold output terminal of 118; multivibrator 114 fires, causing sample and hold network 117 to transfer a fourth difference quantity to the hold output terminal of 117; and multivibrator 115 fires, causing sample and hold network 116 to transfer a new peak value to the hold output terminal of 116. This process of transferring new differences along is repeated on each peak until the wave form 111 decays below detection.

The difference amplifiers 119, 120 are conventional and may take a standard form, having associated amplification to preserve unitary overall gain. The sample and hold networks 116, 117 and 118 may take the form of a diode bridge sampling gate.

To avoid nonlinearities and hence improper output indications it is preferable to use the second difference information in the time interval embracing the first rebound and the nonlinear region—but little beyond. This is achieved by the enabling gate 121 coupled between the output of the second difference amplifier 120 and the subsequent circuitry. The gate is opened to pass the signal by a "one shot" multivibrator 122, whose total time of firing embraces the desired region, and which is itself initiated after a delay provided by a second "one shot" multivibrator 123. The "one shot" multivibrator 123 is fired when the indenter is released as by means of a connection to the solenoid circuit. Ordinarily it should have an adjustable duration, permitting it to be set to fire midway between the initial peak and the first rebound. The second multivibrator 123 also should have an adjustable delay, so as to close the gate 121 within two or three rebounds after they have become elastic.

Evaluation of the data for the quantity $h_u$ is determined by the threshold trigger 124, which is adjustably referenced, and which fires when the "second difference" quantity exceeds the threshold set in. The output of the trigger 124 controls the sample and hold circuit 125, whose signal input circuit takes the peak value stored in the threshold terminal of network 116, and couples it through amplifier 126 to meter 127.

Similarly threshold trigger 128 coupled through an inverter 132 to the output of gate 121 senses a predetermined drop in the value of the second difference quantities toward a zero value. It operates to cause sample and hold network 129 to couple a second peak value, which is amplified in amplifier 130, to $h_u$ meter 131.

The moment the thresholds fire, the quantity coupled to the display meters is that value corresponding to the amplitude of the prior bounce. If the threshold of 124 is set high, this will correspond to sensing an appreciable departure from linearity. Lowering the threshold will have the opposite effect, and will trigger a reading on a lesser departure from linearity.

The quantities coupled to the meters 127 and 131 are logged voltages, representative of the ultimate strength and the yield point. The meters may use a direct reading numerical scale, or merely indicate limits for acceptable values. Reconversion of the input information into a natural scale may be effected if desired.

In general, calibration of the equipment is best achieved by resort to standards and standardized tests. The Shore hardness may be obtained from test blocks, while the other quantities such as the ultimate strength and the yield point require resort to tests in which the material is first measured in the inventive apparatus and then destructively tested, The probe which is herein employed should provide a low frictional path to said indenter as it bounces, so as to eliminate errors in reading attributable to this effect and to increase the number of detectable bounces. In addition it is preferable when a measurement requiring multiple bounces is involved that this be achieved in a manner permitting a randomness in the point of impact, which reduces the chance of successive impacts in a common impact point. Ordinarily a "sloppy" fit in the Teflon bearings will reduce this possibility to the tolerable level.

In general, detecting nonlinearity in a hypothetical plot of successive peak bounce heights of the indenter against bounce number may be achieved by comparing successive ratios of successive peaks, and then detecting a change in said ratios large enough to signify a change in the nature of the indenter collision. While logging the bounce heights is a convenient form in which to obtain a quantity representative of this ratio, one may electronically calculate this ratio in natural numbers. In both cases, one then senses arbitrary changes in successive ratios. In one form, the arbitrary change is in a logarithmic value. In the other form, the arbitrary change is in a natural number. In either case, one may use threshold equipment to select the corresponding height (i.e. pressure) information and apply it to an output indicator.

The invention may be employed in measurement of the yield point alone, or in the measurement of the ultimate tensile strength alone, as well as in both as indicated.

While selected elements are disclosed in the inventive combinations, it is clear that many non-inventive alternatives for these elements exist. Although the invention has been described with respect to certain specific embodiments, it will be appreciated that many modifications may be made by those skilled in the art without departing from the spirit and scope of the invention.

What we claim as new and desire to secure by Letters Patent of the United States is:

1. Apparatus for measuring mechanical properties of a material comprising:
   (a) a probe having an indenter adapted to be dropped upon the surface of the material being measured under conditions producing a surface deformation and to rebound successively in decaying to a rest position, said probe producing an electrical output indication of the instantaneous height of said indenter,
   (b) means to convert said output indication into logarithmic form, and
   (c) display means responsive to said converted output indication, including in said display at least two peak values for said bounce heights.

2. The apparatus of claim 1 wherein said probe comprises a linear variable differential transformer for producing an electrical output in the form of an alternating carrier, amplitude modulated in accordance with the instantaneous height of said indenter, and having in addition thereto a detector coupled to said logarithmic conversion means to recover said logarithmic height information for application to said display means.

3. The apparatus of claim 2 wherein said detector is a synchronous detector and adjustable means are provided for coupling a carrier synchronous wave thereto, adjustable in phase.

4. The apparatus of claim 1 having in addition thereto means to detect the occurrence of each bounce, and means responsive to said bounce detection means to separate the values for each bounce.

5. The apparatus of claim 4 wherein said separation means produces an electrical output indication proportional to the number of bounces detected, and wherein said display means is an area display to which the logarithmic height output is applied to provide displacement along one axis, and the electrical output indication of said separation means is applied to provide displacement along an orthogonal axis.

6. The apparatus of claim 5 wherein said probe is adjusted to produce a minimum output indication when said indenter is near said surface and wherein said bounce detector is responsive to said minimum output indication, to generate an output pulse.

7. The apparatus of claim 4 wherein said display means is a plurality of meters, and wherein said separation means comprise means to sample peaks in said output indication, and means coupled to said sampling means to selectively couple a sampled peak to a meter.

8. The apparatus of claim 7 wherein said selective coupling means are responsive to differences between successive differences in said sampled logged peak values.

9. The apparatus of claim 7 wherein said selective coupling means are responsive to the difference between successive differences exceeding a predetermined threshold to selectively couple a sampled peak to one of said meters, and are responsive to the difference between successive differences falling under a predetermined threshold to selectively couple a sampled peak to another of said meters.

10. Apparatus for measuring mechanical properties of a material comprising:
    (a) a probe having an indenter adapted to be dropped upon the surface of the material being measured under conditions producing a surface deformation and to rebound successively in decaying to a rest position, said probe producing an electrical output indication of the instantaneous height of said indenter,
    (b) means to convert said output indication into logarithmic form,
    (c) means coupled to said conversion means to sample and hold the peaks of successive bounces,
    (d) difference means coupled to said sample and hold means to take differences between successive differences in said sampled and held logarithmic peak values in order to sense nonlinearity in the ratios of the peaks of successive bounces, and
    (e) means to couple a corresponding sampled value to a meter in response to a predetermined magnitude in the difference of said differences to indicate the magnitude of the bounce peak when a predetermined nonlinearity in bounce ratio occurs.

11. Apparatus for measuring mechanical properties of a material comprising:
    (a) a probe having an indenter adapted to be dropped upon the surface of the material being measured under conditions producing a surface deformation and to rebound successively in decaying to a rest position, said probe producing an electrical output indication of the instantaneous height of said indenter,
    (b) means to sample and hold electrical output values representative of peak heights of said bounces,
    (c) means to obtain successive quantities representative of successive ratios of said peak heights,
    (d) a meter responsive to electrical values, and
    (e) means responsive to an arbitrary difference in successive quantities to select a sampled and held output value and couple said selected output value to said meter.

References Cited

UNITED STATES PATENTS

| 2,992,554 | 7/1961 | Stolk | 73—12 |
| 3,038,330 | 6/1962 | Criche | 73—79 |

RICHARD C. QUEISSER, *Primary Examiner.*

H. GOLDSTEIN, *Assistant Examiner.*

U.S. Cl. X.R.

73—79